Fig. 1b

Sept. 17, 1968 R. L. TUCKER 3,402,388
METHOD AND APPARATUS FOR BOREHOLE LOGGING WITH DUAL
DISPLAY OF LOGGING SIGNALS ON RECORD MEDIUM
Filed Oct. 21, 1966 6 Sheets-Sheet 4

INVENTOR
ROBERT L. TUCKER by: Wolfe, Hubbard, Voit & Osann
ATTORNEYS

United States Patent Office 3,402,388
Patented Sept. 17, 1968

3,402,388
METHOD AND APPARATUS FOR BOREHOLE LOGGING WITH DUAL DISPLAY OF LOGGING SIGNALS ON RECORD MEDIUM
Robert L. Tucker, Tulsa, Okla., assignor to Seismograph Service Corporation, Tulsa, Okla., a corporation of Oklahoma
Filed Oct. 21, 1966, Ser. No. 588,557
18 Claims. (Cl. 340—18)

ABSTRACT OF THE DISCLOSURE

A method and apparatus for producing a borehole log representing seismic waves produced in response to periodic seismic signals transmitted at varying depths within a borehole. Successive traces corresponding to successive seismic signals are produced on a recording medium, extending transversely across the medium as a function of time, in response to electrical output signals corresponding to the seismic waves. The intensity of successive transverse traces is varied according to variations in the amplitude of the electrical output. The density variations are periodically interpreted at regular longitudinal intervals, and the amplitude of selected transverse traces is varied according to variations in the amplitude of the electrical output during such interpretations. Time marking and depth marking means are included in the logging system. Also, means are provided for logging a D-C electrical logging signal as a trace extending longitudinally along the variable density and variable amplitude traces with the longitudinally extending trace varying transversely according to variations in the amplitude of the electrical logging signals.

---

The present invention relates generally to an improved method and apparatus for borehole logging and, more particularly, to a method and apparatus for producing improved seismic borehole logs for determining the character of earth formations adjacent the borehole. The terms "seismic" and "acoustic" are used interchangeably herein.

It is a primary object of this invention to provide an improved borehole logging method and apparatus which provides a variable density or "three-dimensional" log containing more information than has been available in conventional seismic logs produced heretofore. A related object of the invention is to provide such a method and apparatus which provides a three-dimensional borehole log which can be more readily analyzed than the borehole logs which were available prior to this invention.

It is a more particular object of the invention to provide an improved borehole logging method and apparatus for producing a three-dimensional log which includes a dual display of the variations in amplitude of the seismic signals detected by the borehole receiver. In this connection, it is an object of the invention to provide such a borehole logging method and apparatus which provides a log record including both a variable density and a variable amplitude display of the detected seismic signals, with the two displays being integrated to form a composite record which facilitates analysis of the borehole log.

Another object of the present invention is to provide an improved borehole logging method and apparatus of the foregoing type which provides a variable density log including an additional channel for recording selected additional information supplementing the information contained in the variable density record and in side-by-side relationship therewith for easy analysis. Thus, it is an object of one aspect of the invention to provide a borehole logging method and apparatus which provides a log of both the acoustic and electrical properties (or any other parameter capable of being converted to D-C or low frequency A-C) of the subsurface formations on a single recording medium and according to the same depth indicia.

It is a further object of the present invention to provide an improved borehole logging system of the type described above which produces a log record with time and depth indicia for facilitating analysis of the record. Thus, it is a related object of the invention to provide such a system which produces easily recognizable depth lines extending across the record at regular longitudinal intervals, and which also produces distinct time marks at regular transverse intervals along each transverse trace of the record.

Other objects and advantages of the invention will become apparent from the following detailed description taken in connection with the accompanying drawings, in which.

While the invention will be described in connection with certain preferred embodiments, it is to be understood that the invention is not intended to be limited to the disclosed embodiments but, on the contrary, it is intended to cover the various alternatives, modifications and equivalent arrangements included within the spirit and scope of the appended claims.

Figure 1A:
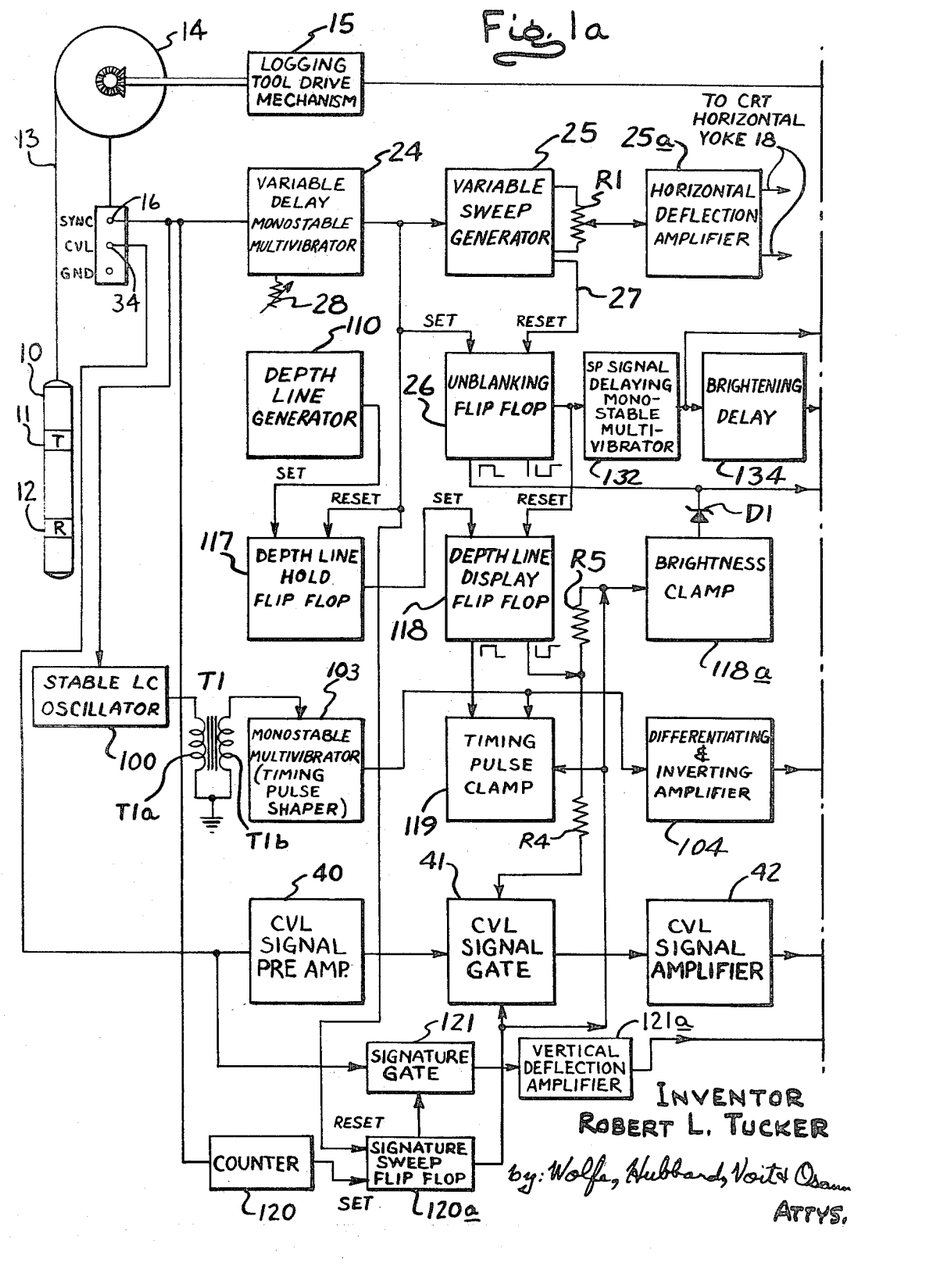
FIGURES 1a and 1b form a block diagram of an improved borehole logging system embodying the present invention.
Figure 1B:
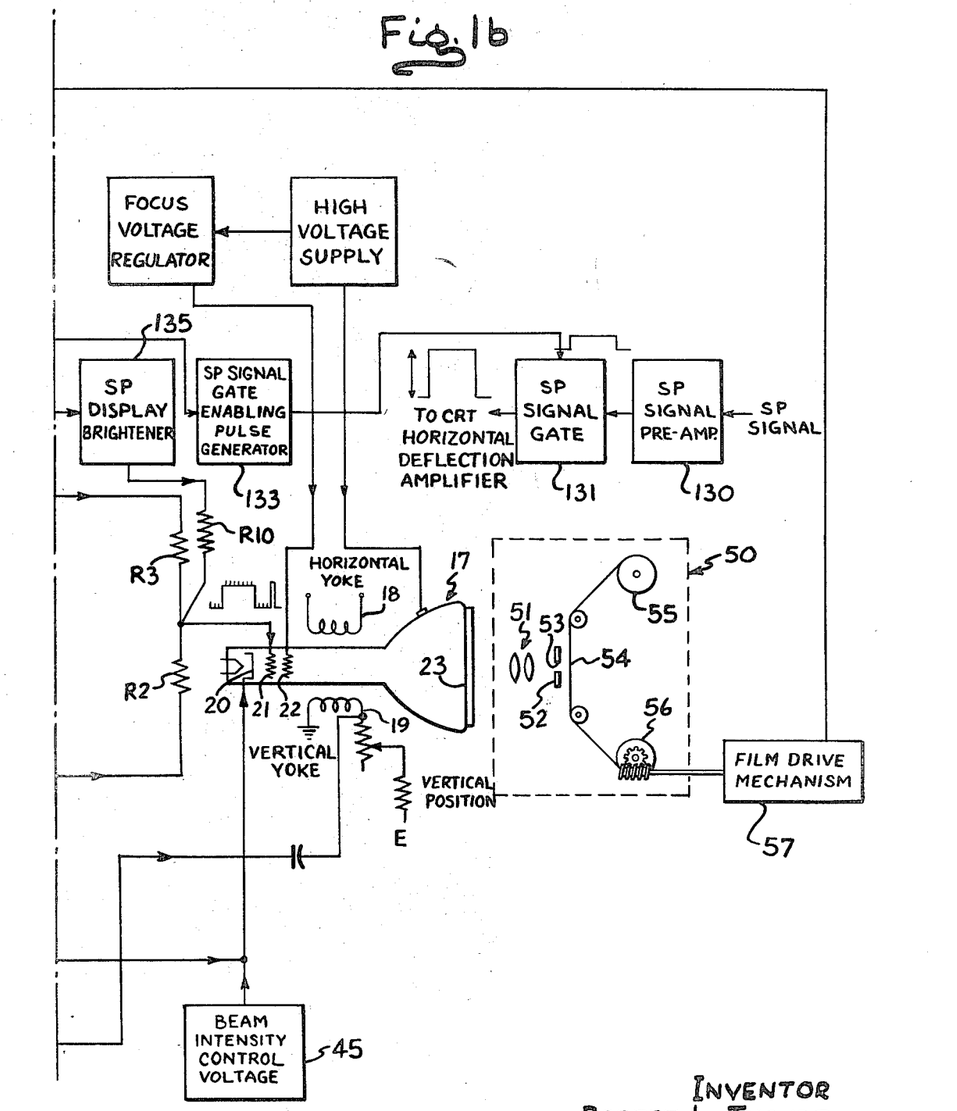

Turning now to the drawings, a schematic diagram of an illustrative borehole logging system embodying this invention for producing a three-dimensional (variable density) log of the earth formations surrounding a borehole is illustrated in FIGURE 1. In this system, a logging tool 10 carries an omnidirectional transmitter 11 which is located a fixed vertical distance from a receiver 12. The transmitter 11 generates seismic impulses while the resultant seismic waves, including both the initially arriving seismic signals and the subsequently arriving wave energy, are detected by the receiver 12 which develops an output varying in amplitude as a function of the amplitude of the detected seismic waves. Surface equipment operatively associated with the transmitter and receiver and responsive to both the generated impulses and the receiver output, records data representing the transit times required for the various seismic waves to travel from the transmitter to the receiver, the waves being propagated through the subsurface formations located between the transmitter and receiver. One suitable transmitter is in the form of a cylindrical ring designed so that a pulse of energy produces circumferential forces which radiate symmetrically in the radial direction and spread geometrically in the axial direction. The transmitter 11 may be powered either from the surface or from a suitable power source in the downhole equipment.

In order that the downhole logging tool may be moved vertically through the borehole at a controlled rate, it is suspended from a cable 13 which is trained about a roller 14 driven by a suitable drive mechanism 15. The borehole is bounded by subsurface earth formations having characteristics to be determined by the logging system and may contain drilling fluid as is conventional in the art. Although the downhole logging tool 10 has been illustrated as including only a single receiver 12, it will be understood that two receivers would be more commonly employed in a commercial system. It will be appreciated that the period between the seismic impulses generated by the transmitter 11 should ordinarily be longer than the time required for the acoustic waves to travel to the receiver 12 even in the lowest velocity formations encountered in logging the borehole, so that sufficient time is provided for both the initially arriving components of the signal and the significant portions of the subsequently arriving complex waves to reach the receiver before the next seismic impulse is generated.

Each time the transmitter 11 within the borehole generates a seismic impulse or signal, it simultaneously transmits an electrical pulse through the cable conductor 13 to a surface terminal 16. As will be apparent from the ensuing description, each of these electrical pulses generated by the transmitter 11 is utilized to initiate a separate trace on the log, thereby synchronizing successive transverse traces on the log with the transmission of the seismic impulses within the borehole. Accordingly, these electrical pulses will be referred to hereinafter as the "sync" pulses, and the terminal 16 is so labelled in the accompanying drawing.

In order to provide a visible display of the seismic log, the surface equipment includes a cathode ray tube (CRT) 17 which includes the conventional deflection yokes 18 and 19 for deflecting an electron beam derived from a cathode 20, and a pair of control grids 21 and 22 for regulating the intensity of the electron beam so as to control the luminosity of the visible trace produced by the beam as it impinges upon a phosphorescent viewing screen 23. For convenience, certain portions of the circuitry conventionally associated with cathode ray tubes, such as that employed for accelerating the electrons of the beam, are not shown.

For the purpose of repetitively sweeping the beam of the CRT 17 transversely across the face of the tube in synchronism with the transmission of the repetitive seismic impulses within the borehole, the sync pulses from the terminal 16 are feed into a monostable multivibrator 24, which in turn triggers a variable sweep generator 25 operatively associated with the horizontal deflection yoke 18 of the CRT 17. The variable sweep generator 25 generates a ramp output through a variable resistor R1 to a horizontal deflection amplifier 25a for sweeping the CRT beam transversely across the tube face. In order to provide successive unidirectional traces corresponding to the successive seismic impulses, the output from the multivibrator 24 also triggers an unblanking flip-flop 26 which is connected to the control grid 21 of the CRT 17 for the purpose of turning the CRT beam on at the start of each ramp. The output from the flip-flop 26 adjusts the potential of the control grid 21 to cause the electron beam to make a visible trace until the flip-flop 26 is reset to turn the beam off at the end of each ramp so that the beam can be returned to its starting position without forming a trace. The resetting pulse for triggering the unblanking flip-flop 26 to turn the beam off is supplied from the ramp generator 25 through a line 27.

In order to delay each transverse sweep of the CRT beam for a brief initial interval, such as several microseconds for example, while the first seismic wave is traveling to the receiver in the borehole, the monostable multivibrator 24 is provided with a variable delay network indicated schematically at 28. This delay network may conveniently take the form of a conventional RC circuit which is variable to permit adjustment for a plurality of delay periods.

Figure 2:
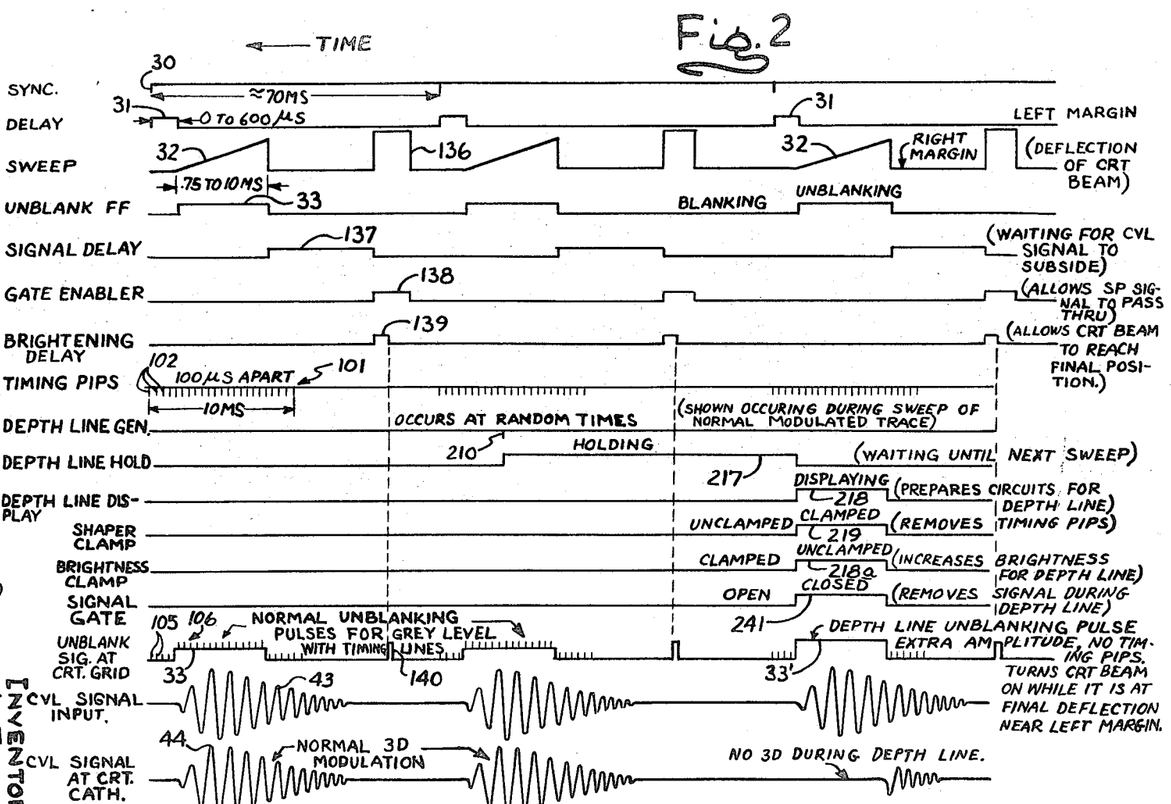
FIG. 2 is a series of schematic representations of representative waveforms produced at various points in the system of FIGS. 1a and 1b with the different waveforms arranged side-by-side to show the time relationship therebetween.

To assist in an understanding of the illustrative system, it will be helpful to review the operation of the circuits described thus far in connection with the representative waveforms illustrated in FIGURE 2. Thus, the sync pulses indicated at 30 in FIGURE 2 trigger the monostable multivibrator 25 at intervals corresponding to the intervals between successive seismic signals generated by the borehole transmitter 11, a typical interval being indicated in FIGURE 2 as 70 milliseconds. In response to each triggering sync pulse, the delaying multivibrator 24 produces an output pulse 31 having a pulse width determined by the setting of the RC delay network 28. A typical pulse width of 600 microseconds is illustrated in FIGURE 2. The output pulse 31 is applied to the variable sweep generator 25 which responds by producing a ramp output 32 with the start of the ramp coinciding in time with the trailing edge of the pulse 31. The ramp output 32 is applied to the horizontal yoke of the CRT 17 so as to sweep the beam thereof linearly across the screen of the tube. The output pulse 31 from the monostable multivibrator 24 also sets the unblanking flip-flop or bistable multivibrator 26 which responds by producing an output 33 which is applied to the CRT control grid 21 to turn the beam on until the multivibrator 24 is reset simultaneously with the termination of the ramp signal 32. It can be seen that the unblanking output 33 commences simultaneously with the trailing edge of the pulse 31, and is terminated by resetting the flip-flop 26 with a signal from the ramp generator 25. Consequently, there is a short delay period following the transmission of each seismic signal, after which the CRT beam is turned on and swept linearly across the face of the tube. The beam is turned off at the end of each sweep by the trailing edge of waveform 33, and returned to its starting position by the trailing edge of the ramp signal 32.

As the acoustic signals generated by the transmitter 11 are detected by the logging tool receiver 12, they are converted to analogous electrical signals which are transmitted through the cable conductor 13 to a surface terminal 34. An electrical signal of this type, commonly referred to as a continuous velocity log signal, is well known in the seismic exploration art and will be referred to hereinafter as the "CVL signal." It will be appreciated that the CVL signal is a complex wave resulting from the multiple medium paths traversed by the sonic energy generated by the transmitter 11, and the skilled analyst can obtain a considerable amount of information from such waves. In order to present the complex waves in a form which is useful to the analyst, it is desirable to provide a visible record of the varying amplitude of the successive CVL signals as a function of time. In the illustrative embodiment, this is accomplished by using the CVL signal to modulate the intensity of the CRT beam so as to vary the density of the beam traces in accordance with the amplitude of the CVL signal.

Thus, the CVL signal is fed from the terminal 34 through a pre-amplifier 40, a gate 41, and amplifier 42 to the cathode 20 of the CRT 17 so that the CRT beam is intensity-modulated by the CVL signal in the conventional manner. The CVL signal at the input to the pre-amplifier 40 is represented by the waveform 43 in FIGURE 2, and the corresponding signal applied to the CRT cathode 20 is represented by the waveform 44. It will be understood that this waveform 44 is superimposed on the normal beam intensity control voltage supplied from the source 45.

In order to produce a permanent record of the successive intensity-modulated sweeps of the CRT beam, a recording camera 50 is provided for continuously recording the successive transverse traces formed on the CRT screen. In the particular embodiment illustrated in the drawings, the recording camera 50 includes a lens system 51 and a masking plate 52 having an aperture 53 therein for directing the light traces on the CRT screen onto an elongated recording medium or film 54, thereby making a permanent record of the beam traces to which the film is exposed. The film 54 is advanced past the CRT screen from a supply reel 55 to a takeup reel 56 by means of a magazine type film drive system indicated generally at 57. The system 57 is driven in synchronism with the logging tool drive 15 so as to advance the film at a rate which is correlated with the movement of the tool 10 through the borehole. The advancement of the film 54 by the drive system 57 displaces each successive trace formed by the transverse sweep of the beam a slight longitudinal distance from the preceding trace so that, as a result, the successive transverse traces are developed in side-by-side relationship on the film with their starting points aligned longitudinally as illustrated in the exemplary record of FIGURE 3. Of course, each trace varies in density across the width of the film in accordance with variations in the amplitude of the CVL signal used to moderate the beam intensity.

For the purpose of improving the resolution of the light traces which are recorded on the film 54, the CRT 17 preferably includes a fiber optic faceplate. The fiber optic faceplate has been found to be extremely valuable in providing higher resolution of the recorded traces, thereby facilitating analysis of the resultant record. Moreover, no lens system is required with the fiber optics faceplate, and the resultant package is considerably less bulky than any system proposed heretofore. Cathode ray tubes of this type are commercially available, a typical example being the Dumont type KC 2378P tube manufactured by Allen B. Dumont Laboratories, Clifton, N.J. The Dumont tube is provided with a flat fiber optic faceplate in which each fiber has an extra mural absorption cladding which absorbs stray light and reduces fiber cross talk.

In order to facilitate correlation of any given portion of the transverse traces with the particular transit time corresponding to that portion of the trace, means are provided for forming time markings at equally spaced transverse intervals along each trace. The time markings on adjacent traces are aligned with each other so that a longitudinal series of such traces forms a facsimile of longitudinal time lines extending continuously through the traces along the length of the recording medium. Thus, in the illustrative embodiment shown in the drawings, a series of timing pulses is generated by an oscillator 100 for instantaneously increasing the intensity of the beam in the CRT 17 at regular transverse intervals along each trace. The oscillator 100, which may be a stable LC oscillator of conventional design, is actuated by each sync pulse to produce a train of negative-going pulses for some preselected period which is slightly longer than the duration of one sweep. This timing pulse train is represented by waveform 101 in FIGURE 2 as a 10-millisecond train of pulses 102 spaced apart by 100 microseconds.

From the oscillator 100, the timing pulse train is fed into a timing pulse shaper comprising a transformer T1 and a monostable multivibrator 103. Thus, the 100-microsecond timing pulses are applied to the primary winding T1a of the transformer T1 so as to induce corresponding pulses in the secondary winding T1b connected to the input of the multivibrator 103. The timing pulses 102 trigger the multivibrator 103 to produce output pulses of predetermined width and amplitude at the same 100-microsecond intervals as the input pulses. These pulses are finally fed through a conventional differentiating and inverting amplifier 104, to produce a final timing pulse train of sharp pips 105 (FIGURE 2) of short duration and high amplitude. As can be seen in FIGURE 1a, the amplifier output is fed through a resistor R2 to the same CRT control grid 21 to which the unblanking flip-flop 20 is connected, so that the timing pips are actually added to the unblanking signal 33. The resulting signal applied to the grid 21 for controlling the CRT beam intensity is represented by the composite waveform 106 in FIGURE 6.

Figure 3:
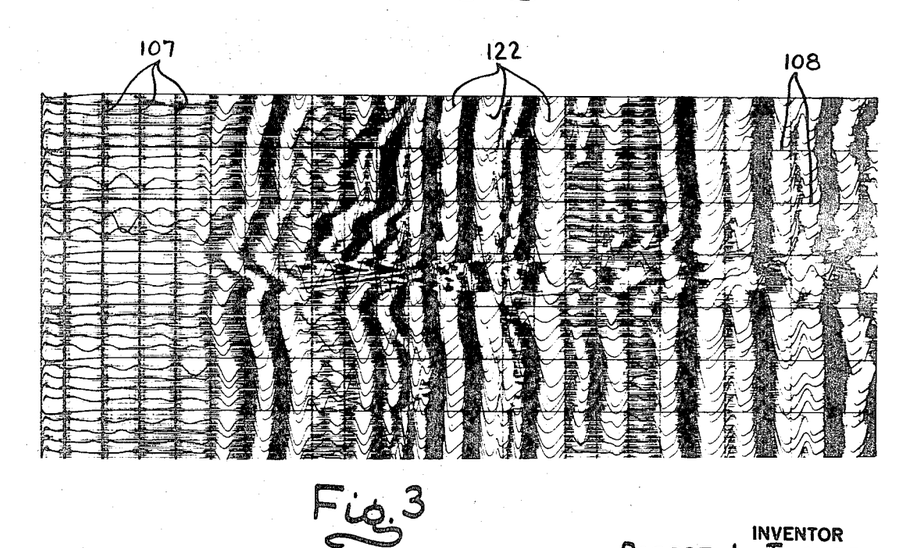
FIG. 3 is a fragmentary view of an exemplary log record produced by the illustrative system of FIGS. 1a and 1b.

As can be seen from the exemplary recording in FIGURE 3, the periodic instantaneous increases in the beam intensity due to the timing pips 105 produce regular dots or marks of increased density at equally-spaced intervals across each transverse trace of the CRT beam. Consequently, as a multiplicity of traces are produced in close succession, the dots of adjacent traces tend to overlap and blend together to form a facsimile of a series of continuous, longitudinal lines 107 with the space between each pair of lines representing a timed interval of 100 microseconds. Thus, by counting the number of lines from the left hand or zero margin of the three-dimensional record, the analyst may readily determine the transit time represented by any specific portion of the record and thereby determine the effect of the geological formation at that particular area on the velocity of the seismic signal. Since the timing pips are present for a time equal to the longest sweep plus a small margin, the amplitude of the pulses 105 applied to the CRT control grid 21 should be substantially less than that of unblanking signal 33, as illustrated by the waveform 106 in FIGURE 2, in order to prevent the timing pips from turning on the CRT beam between traces.

In order that the analyst may readily determine the particular borehole depth corresponding to any given point on the recorded variable density log, periodic depth markings are provided in the form of unmodulated or straight, uniform, transverse traces extending across the recording medium at equal longitudinal intervals. Thus, in the exemplary record illustrated in FIGURE 3, straight transverse traces 108 extend across the recording medium at equal intervals corresponding to depth increments of 10 feet, for example.

In order to initiate depth marking traces at regular longitudinal intervals along the recording medium a depth line generator 110 includes a light-actuated silicon controlled rectifier (SCR) 111 (see FIG. 4) which is illuminated at regular intervals by a light source 112 directed onto an opaque cylinder 113 disposed around the SCR 111. An appropriate slot 114 is formed in the cylinder 113 so as to periodically pass light from the source 112 onto the SCR 111. The cylinder 113 is driven in synchronism with the logging tool drive 15 so as to rotate the cylinder 113 at a speed which is correlated with the movement of the tool 10 through the borehole. Thus, successive illuminations of the SCR 111 occur at equal increments of borehole depth, with each illumination providing a fast voltage fall across the SCR 111 for use as a trigger. A current-limiting resistor R6 is connected in series with the lamp 112.

Figure 4:
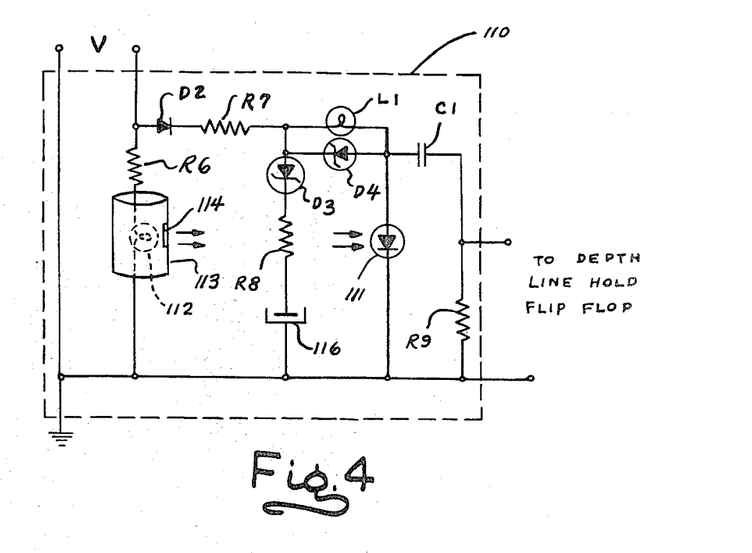
FIG. 4 is a schematic circuit diagram of the depth line generator used in the system of FIGS. 1a and 1b.

As the SCR 111 is illuminated, it is rendered momentarily conductive so as to transmit a pulse from a capacitor 116 to a flip-flop 117, referred to hereinafter as the "depth line hold" flip-flop. This pulse sets the flip-flop 117 to condition it for resetting by the next output pulse from the variable delay multivibrator 24. Thus, the depth line hold flip-flop 117 delays initiation of the unmodulated depth line marking traces until completion of the modulated trace in progress when the SCR is illuminated. This delay or holding feature is important because the pulse generated by illumination of the SCR 111 may occur at any time during a normal, intensity-modulated trace. After completion of the modulated trace in progress, the flip-flop 117 is reset by the pulse output from the variable delay multivibrator 24 in response to the next sync pulse. As the flip-flop 117 is reset, it produces an output pulse to set a second flip-flop 118 referred to as the "depth-line display" flip-flop. The second flip-flop 118 actuates a brightness clamp 118a, via resistor R5, which is connected through a Zener diode D1 and a resistor R3 to the control grid 21 for the purpose of increasing the intensity of the CRT beam to a predetermined uniform level for the ensuing trace.

The illustrative depth line generator circuit also includes a diode D2 for providing half cycles of the 60 c.p.s. wave to the circuit starting with resistor R7, which limits the peak current through the diode D2 to a safe value. For the purpose of limiting the charge and discharge times of the capacitor 116, a resistor R8 is connected in series therewith, along with a diode D3 which provides a bias reference. An RC combination of resistor R9 and capacitor C1 differentiates the fast waveform across SCR 111 so that negative-going spikes are available to set the depth line hold flip-flop 117. Finally, the circuit includes a panel lamp L1 which provides a visual indication of ten-foot intervals and is used in establishing a starting point for depth reference. Zener diode D4 limits the voltage across L1 to a safe value.

In order to cut off the modulating CVL signal during the depth line marking trace, the output from the depth line display flip-flop 118 is also fed through a resistor R4 to the gate 41 in the CVL input circuit. This closes the gate 41 until it is subsequently reopened by resetting of the flip-flop 118. As a result, the depth line marking trace occurs at a constant intensity to form a continuous straight line on the the recording film, without any intensity modulation whatever.

To form the depth markings as continuous lines across the record, it is preferable to cut off the timing pulses during the depth marking trace. For this purpose, the output from the depth line display flip-flop 118 is applied to a timing pulse clamp 119 operatively associated with the timing pulse circuit between the timing pulse shaper 103 and the amplifier 104. Thus, the clamp 119 responds to the initiation of each depth marking trace to prevent the monostable multivibrator 103 from triggering and generating a pulse, so that no timing pulses are applied to the CRT until the next modulated trace.

To facilitate an understanding of the depth line marking system, it will be briefly reviewed with reference to the illustrative waveforms of FIG. 2. Thus, the depth line generator 110 produces output pulses 210 which may occur at any time during a normal intensity-modulated trace, or between successive traces. The pulse output 210 sets the depth line hold flip-flop 117 which demains in the set state until reset by the termination of the next output pulse 31 from the variable delay multivibrator 24, as indicated by the waveform 217 in FIG. 2. Accordingly, it can be seen that the depth line hold flip-flop provides a holding period between the occurrence of the pulse 210 and the start of the next sweep output 32.

As the flip-flop 117 is reset, it actuatees the depth line display flip-flop 118 (waveform 218), which in turn actuates the brightness clamp 118a to increase the intensity of the CRT beam for the next trace. Thus, the normal unblanking output 33 is suplemented by the output 218a from the brightness clamp 118a, thereby applying an increased composite unblanking signal 33' to the CRT control grid 21. Consequently, the ensuing depth line trace 103 has a relatively high intensity so that it provides a distinct black line exposure on the recording film. In addition to actuating the brightness clamp 118a, the output 218a from the depth line display flip-flop 118 also closes the CVL signal gate 41, as indicated by the gate waveform 241 in FIG. 2, and actuates the timing pulse clamp 119, as indicated by waveform 219, to cut off the timing pips 105 during the depth line trace.

In accordance with one important aspect of this invention, means are provided for periodically modulating the amplitude rather than the intensity of the CRT beam with the CVL signal so as to provide amplitude modulated traces or "signatures" of the CVL signal at regular longitudinal intervals along the variable density log. Consequently, the information contained in the CVL signal is displayed in two different forms on a single log so that the analyst can more readily determine the character of the earth formations adjacent the particular borehole being logged. Thus, referring to FIGURE 1, a counter 120 of conventional design is operatively connected to the sync pulse terminal 16 for counting successive sync pulses so that amplitude modulated traces can be produced at regular intervals corresponding to a predetermined number of sync pulses. For this purpose, the counter 120 is preset to produce an output pulse in response to a selected number of sync pulses, typically about 8 to 10 pulses.

For the purpose of cutting off the intensity-modulating signal normally applied to the Z axis of the CRT beam and substituting an amplitude modulating signal applied to the vertical deflection yoke of the CRT, each output pulse from the counter 120 closes the intensity-modulating signal gate 41 and opens an amplitude modulating signature gate 121. The gate 121 passes the CVL signal through a vertical deflection amplifier 121a to a vertical deflection yoke 19 of the CRT 17 so that the next transverse trace of the CRT beam is deflected vertically according to the varying amplitude of the CVL signal. This amplitude modulated trace will be referred to hereinafter as the "signature sweep."

In order to make each signature sweep sharp and clear to facilitate analysis of the resultant composite log, it is preferred to cut off the timing pulses and increase the beam intensity during each signature sweep. This is accomplished in the same manner described above for the depth marking traces. Thus, the output from the counter 120 sets a signature sweep flip-flop 120a with the resulting output being applied to the timing pulse clamp 119 which responds by clamping the output of the multivibrator 103 to ground so that no timing pulses are applied to the CRT until the next trace. To increase the beam intensinty during the signature sweep, the output of the counter 120 is applied to the brightnes clamp 118a which increases the beam intensity to a predetermined uniform level. As illustrated by the exemplary log in FIGURE 3, the resulting signature sweeps 122 are easily distinguishable from the intervening variable density traces, and provide a valuable supplement when integrated withf the conventional variable density log as illustrated.

After each signature sweep has been completed, the control circuit is reset to form the conventional variable density log again. Thus, the next sync pulse after completion of a signature sweep triggers the multivibrator 24 to produce an output pulse which resets the signature sweep flip-flop 120a. The resetting of the flip-flop 120a closes the amplitude modulating signature gate 121, opens the intensity-modulating signal gate 41, and removes the clamp supplied by the timing pulse clamp 119 and the brightness clamp 118a. It will be recognized that the ratio of signature sweeps to variable density traces may be varied simply by adjusting the setting of the counter 120.

In accordance with another aspect of the present invention, an additional longitudinal channel is provided in the recording system for recording additional information derived from a slowly varying D-C signal, such as a "spontaneous potential" signal for example. A spontaneous potential signal is a well-known means for identifying the character of earth formations adjacent a borehole by measurement of the electrical properties of the various strata of such formations. In keeping with this invention, the additional optional channel is provided immediately adjacent the variable density log and on the same depth scale, so that the analyst may readily correlate different types of information presented on the resultant log. Thus, in the illustrative system, a spontaneous potential (SP) signal derived from the downhole equipment conventionally used to produce such a signal is fed through a pre-amplifier 130 to a spontaneous potential gate 131. The output of the gate 131 is connected to the horizontal deflection yoke of the CRT 17 for deflecting the CRT horizontally in accordance with the amplitude of the SP signal.

The SP signal trace is formed by turning on the CRT beam for an instant between each pair of successive modulated traces corresponding to the CVL signal. However, since the CVL signal is apt to last longer than the sweep of the CRT beam, it is necessary to wait until the CVL signal has died out before the CRT beam is turned on for displaying the SP signal. Accordingly, the end of each unblanking pulse produced by the unblanking flip-flop 26 is used to trigger a SP signal delaying monostable multivibrator 132 which delays opening of the SP signal gate 131 until the CVL signal has subsided. After this delaying interval, the multivibrator 132 produces a pulse output which triggers a SP signal gate enabling pulse generator 133, which responds by producing a pulse ouput to open the gate 131. The slowly varying D-C. voltage comprising the SP signal is thus passed through the gate 131 and applied to the horizontal deflection yoke 18 so as to deflect the CRT beam horizontally according to the magnitude of the SP signal at that particular time.

In order to provide time for charging the inductance of the horizontal deflect yoke so that the CRT beam can reach its final position before the beam is turned on for the SP signal display, the pulse output produced by the multivibrator 132 is applied to a brightening delay 134. After a predetermined delay period, the multivibrator output activates an SP display brightener 135 which responds by supplying a brightening pulse through a resistor R10 to the CRT grid 21. This turns the CRT beam on for a brief interval to provide a dot type display. This operation is repeated after each successive transverse trace of the CRT beam, so that the successive dots representing the SP signal form essentially a continuous longitudinal trace along the film record. The amplitude of the SP signal passed through the gate 131 is greater than the peak sweep voltage so that the SP trace appears in an otherwise unused region of the film.

Referring to the representative waveforms illustrated in FIGURE 2, the SP signal passed through the gate 131 and applied to the CRT horizontal deflection yoke is represented by the square pulses 136. As can be seen in FIGURE 2, these pulses 136 are applied to the CRT at a predetermined time interval after the termination of each sweep signal 32, and have a magnitude greater than the peak of the sweep signal so as to deflect the CRT beam into the region between the end of the modulated traces and the left margin of the film. The delay interval between the end of the sweep signal 32 and the beginning of the SP signal 136 is determined by the length of the signal delay output 137 from the multivibrator 132. The end of the signal delay triggers both the gate enabler, which produces a pulse 138 to open the SP gate 131, and the brightening delay 134, which produces a pulse 139 to delay the turning on of the CRT beam. At the end of each delaying pulse 139, the CRT beam is turned on by narrow brightening pulse 140 produced by the SP display brightener 135. This pulse 140 turns the CRT beam on while it is at its final deflection near the left margin of the recording film.

Figure 5:
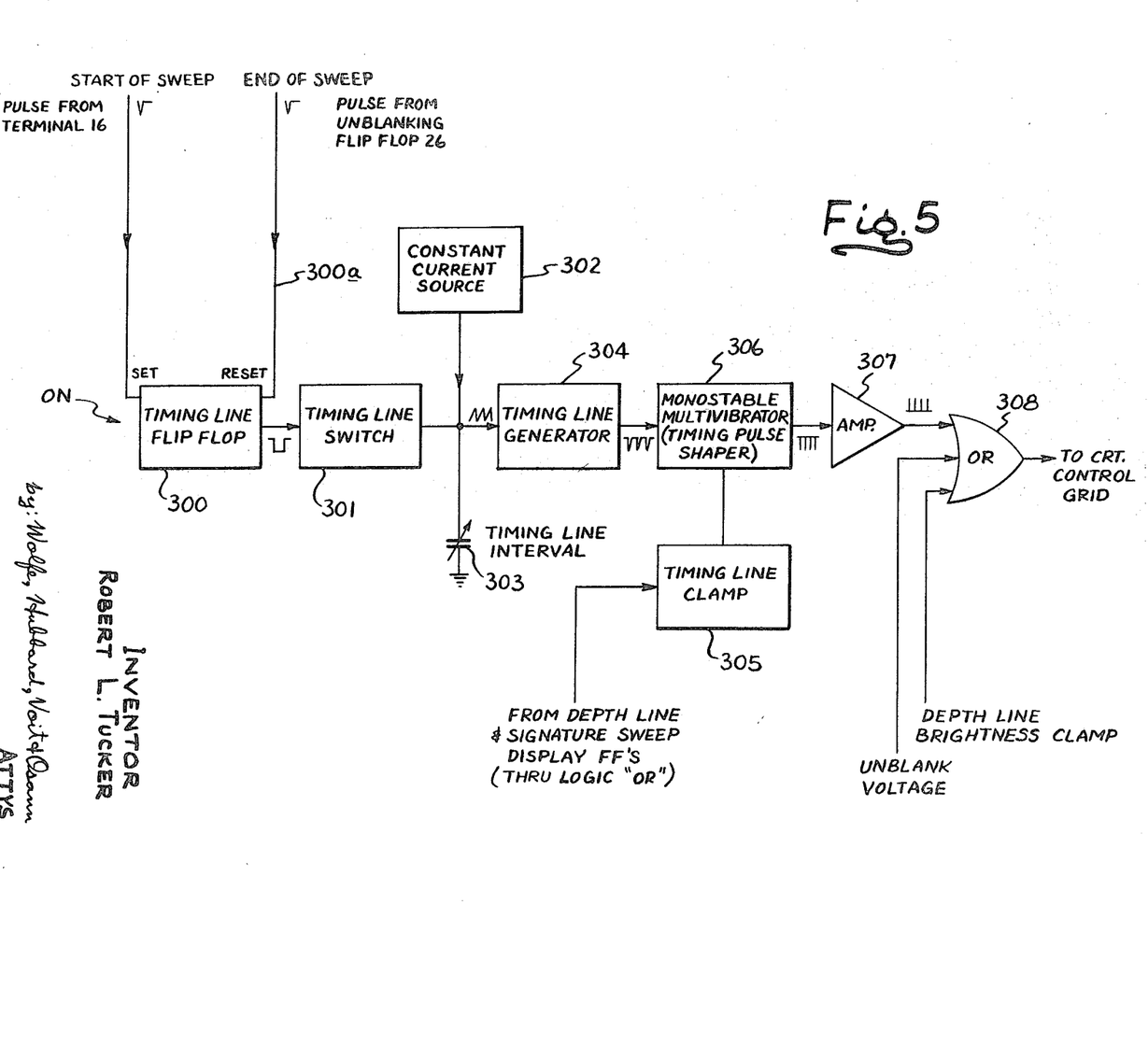
FIG. 5 is a block diagram of a modified form of a part of the system of FIGS. 1a and 1b for producing the time markings.

While the present invention has been described above in connection with one particular embodiment, it will be recognized that various alternative circuits may be devised for accomplishing the same general functions carried out by the illustrative system. One alternative system for producing the desired time markings is shown in FIGURE 5. In this system, each sync pulse from the terminal 16 sets a "timing line on" flip flop 300 which controls on-off voltage to a timing line switch 301. When the flip flop 300 is set, the switch voltage is off so that current from a constant current source 302 flows into a variable capacitor 303 which controls the interval between successive timing pips, as will be seen from the ensuing description. The voltage across the capacitor 303 rises linearly to a trigger point imposed by a timing line generator 304, at which point the voltage drops abruptly to near zero. In response to each drop in voltage, the generator 304 generates an output pulse which corresponds to one of the timing pips 102 produced by the system of FIGS. 1–4. The timing line generator 304 is typically a unijunction transistor.

In accordance with one aspect of this particular embodiment of the invention, the electrical time marking system includes means for terminating the timing pips at the end of each transverse sweep of the tube beam, rather than continuing the timing pips for some preselected period which must be set slightly longer than the duration of one sweep. Thus, the train of timing pips produced by the generator 304 is terminated by resetting the flip flop 300 with the output from the unblanking flip flop 26 at the end of each sweep, as illustrated by the line 300a in FIG. 5. Consequently, in the time interval between the application of each sync pulse and the end of the sweep initiated by that pulse, the timing line generator 304 produces a series of output pulses or timing pips which are used in exactly the same way as the timing pips produced in the system of FIGS. 1–4, but which are terminated simultaneously with the end of the sweep.

In order to shape the pulses produced by the generator 304, they are fed into a monostable multivibrator 306 which produces corresponding output pulses of predetermined width and amplitude, in the same manner as the multivibrator 103 described above. These pulses are fed into an amplifier 307 corresponding to the aforedescribed amplifier 104 to produce a final timing pulse train of sharp pips corresponding to the pips 105 in FIG. 2. Similarly, a timing line clamp 305 deactivates the timing line system whenever a depth line or signature sweep occurs, in the same manner described above in connection with the timing pulse clamp 119. Finally, an OR gate 308 serves the same function as the resistive summing network R2, R3 in applying the timing pips, the unblanking signal, and the depth line brightness clamp signal to the CRT control grid.

In accordance with a further aspect of this invention, an alternative depth line and signature sweep system is provided for producing a signature sweep each time the downhole tool progresses a predetermined distance, rather than according to the number of seismic signals generated. Thus, in FIG. 6 there is shown an alternative depth line and signature sweep system including a signature sweep generator 310 similar to the depth line generator 110 previously described. That is, the signature sweep generator 310 is used in place of the counter arrangement described in connection with FIGURE 1, with both the depth line generator 110 and the signature sweep generator 310 being mechanically coupled to the main drive for the logging tool for producing output pulses synchronized with the rate of advance of the tool through the borehole. The signature sweep generator 310 is generally designed to produce an output more frequently than the depth line generator 110, but whenever the depth line occurs, it is caused to pre-empt the signature sweep by arranging the mechanical couplings to produce the depth line pulse a finite time before the signature sweep pulse.

Figure 6:
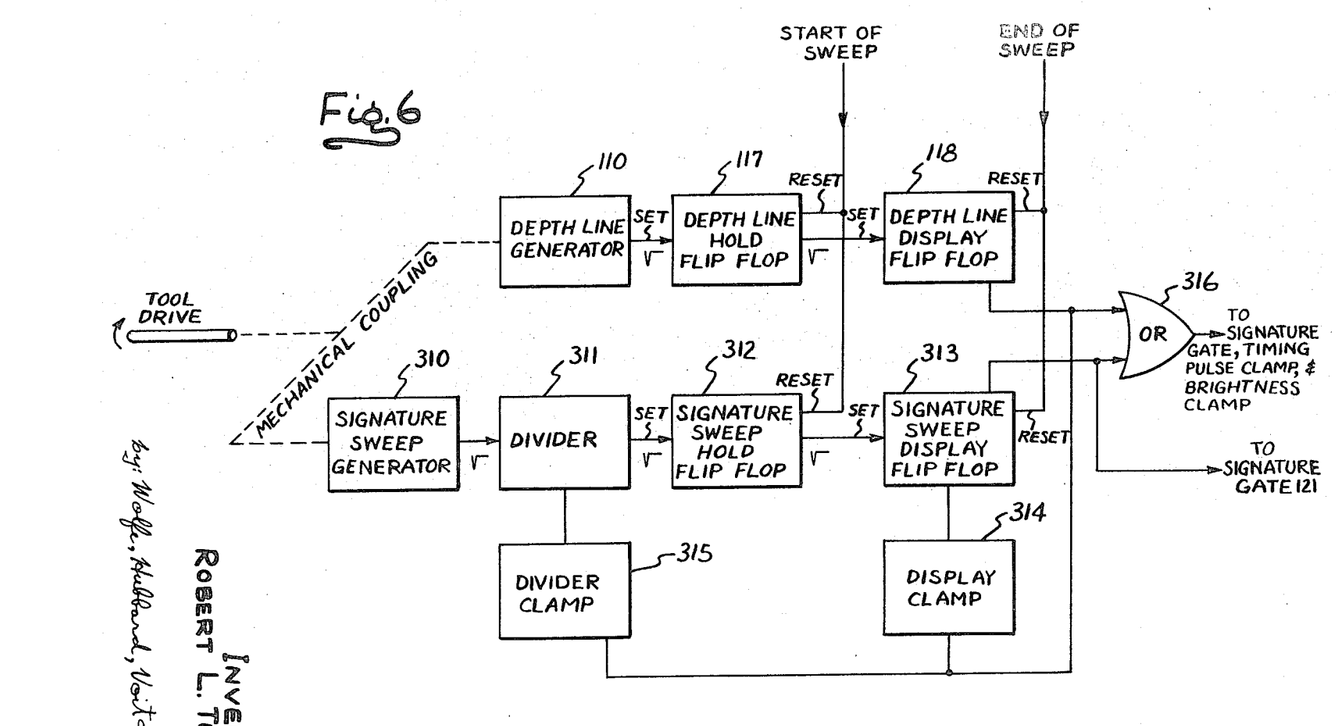
FIG. 6 is a block diagram of a modified form of a part of the system of FIGS. 1a and 1b for producing the signature sweeps and depth lines.

For the purpose of controlling the intervals at which the signature sweep occurs, the output from the signature sweep generator 310 is fed into a divider 311 which may be set to produce an output pulse in response to a preselected number of input pulses from the generator 310. Of course, since the output from the generator 310 is a function of the tool progress through the borehole, so is the divider output, regardless of the particular setting of the divider. The divider output sets a "signature sweep hold" flip flop 312 to condition it for resetting by the next start-of-sweep pulse from the variable delay multivibrator 24. Consequently, the signature sweep hold flip flop 312 delays initiation of the signature sweep until completion of any modulated trace in progress when the signature sweep generator 310 is activated, in the same manner described above for the depth line hold flip flop 117.

When the signature sweep hold flip flop 312 is reset at the start of the next sweep, it produces an output pulse which sets a signature sweep display flip flop 313 corresponding to the depth line display flip flop 118 described above. That is, the output from the flip flop 313 when it is set functions through an OR gate 316 to (1) increase the intensity of the CRT beam to a predetermined uniform level by actuating a brightness clamp such as the clamp 118a described above, (2) cut off the intensity-modulating signal normally applied to the z axis of the CRT beam and substitute an amplitude-modulating signal applied to the vertical deflection yoke of the CRT, and (3) cut off the timing pulses. These functions, which are similar to the functions initiated by the flip flop 120a in the system of FIG. 1, are continued until the end of the signature sweep, which is terminated by resetting the flip flop 313 by means of a pulse from the unblanking flip flop 26.

As shown in FIGURE 6, the depth line display flip flop 118 is connected to a display clamp 314 to effectively cut off the signature sweep system during each depth line marking trace. A divider clamp 315, also actuated by the depth line display flip flop 118, has the effect of zeroing the divider 311 as a guard against spurious pulses triggering the divider and thereby causing the signature sweep to occur at irregular intervals.

As can be seen from the foregoing detailed description, the improved borehole logging method and apparatus of this invention provides a variable density or "three-dimensional" log containing considerably more information than has been available in conventional seismic logs produced heretofore, and thus the borehole log can be more readily analyzed to determine the character of the earth formations adjacent the borehole. The illustrative system provided by this invention produces a three-dimensional log which includes a dual display of the variations in amplitude of the seismic signals detected by the borehole receiver, and also includes an additional channel for recording selected additional information such as an SP signal to supplement the information contained in the variable density record and in side-by-side relationship therewith for easy analysis.

I claim as my invention:

1. Apparatus for producing borehole logs comprising the combination of a downhole tool including transmitting means for generating seismic signals at varying depths within the borehole and receiving means spaced away from said transmitting means for detecting both the initially arriving seismic signals and wave energy arriving thereafter and for developing an output varying in amplitude as a function of the amplitude of the detected seismic signals and wave energy, recording means operatively associated with said downhole tool for recording the detected signals and wave energy on a recording medium as a series of traces extending transversely across the recording medium as a function of time, said recording means including (1) first electrical control means responsive to the output of said receiving means for modulating the intensity of said traces in accordance with variations in the amplitude of said output, (2) second electrical control means operatively associated with said receiving means for periodically deactivating said first electrical control means during selected traces of the recording means and modulating the amplitude of said selected traces in accordance with variations in the amplitude of the output of said receiving means, (3) electrical depth marking means operatively associated with said recording means for periodically deactivating said first electrical control means during selected traces of the recording means so as to form straight transverse traces across the recording medium at regular longitudinal intervals to provide indications of the borehole depth on the resulting record, and (4) electrical time marking means operatively associated with said recording means for forming time marks at equal transverse intervals along each trace with the time marks on successive traces being aligned with each other so as to form longitudinally extending time lines on the resulting record.

2. Apparatus for producing borehole logs comprising the combination of a downhole tool including transmitting means for generating seismic signals at varying depths within the borehole and receiving means spaced away from said transmitting means for detecting both the initially arriving seismic signals and wave energy arriving thereafter and for developing an output varying in amplitude as a function of the amplitude of the detected seismic signals and wave energy, recording means including a cathode ray tube for developing an electron beam and means for sweeping said beam transversely in synchronism with the generated seismic signals, (1) first electrical control means operatively associated with said cathode ray tube and said receiving means for modulating the intensity of the beam of said tube by the output from said receiving means so that the resulting transverse traces formed by the beam vary in density according to variations in the amplitude of the detected signals and wave energy, and (2) second electrical control means operatively associated with said cathode ray tube and said receiving means for periodically deactivating said first electrical control means during selected sweeps of the beam and modulating the vertical position of the beam by the output of said receiving means so that the resulting traces formed by the selected sweeps of the beam vary in amplitude according to variations in the amplitude of the detected signals and wave energy.

3. Apparatus as defined in claim 2 in which said first electrical control means includes an intensity modulation gate operatively associated with said receiving means and said cathode ray tube for modulating the intensity of the beam of said tube by the output from said receiving means so that the resulting transverse traces formed by the beam vary in density according to variations in the amplitude of the detected seismic waves, and second electrical control means includes a counter for counting the generated seismic signals and producing an output pulse in response to the counting of a preselected number of said signals, and an amplitude modulation gate responsive to the counter output for modulating the amplitude modulation gate responsive to the counter output for modulating the amplitude of the beam of said tube by the output from said receiving means so that periodic transverse traces formed by the beam vary in amplitude according to variations in the amplitude of the detected seismic waves, said intensity modulation gate also being responsive to the counter output for interrupting the intensity modulation of the beam during the periodic amplitude modulated traces.

4. Apparatus as defined in claim 3 which includes electrical time marking means operatively associated with said cathode ray tube for increasing the intensity of the beam of said tube at equal transverse intervals along each sweep so as to form a plurality of equally spaced time marks, said time marking means being responsive to the counter output for interrupting the time marks during the periodic amplitude modulated traces.

5. In apparatus for producing borehole logs from seismic signals and D.-C. electrical logging signals, the combination comprising recording means operatively associated with the downhole equipment and including a cathode ray tube for developing an electron beam and means for sweeping said beam transversely back and forth across a recording medium in synchronism with the seismic signals, (1) first electrical control means operatively associated with said cathode ray tube and responsive to the seismic signals for intensity modulating successive sweeps of the beam of said cathode ray tube according to variations in the amplitude of successive seismic signals so as to form a variable density log of said seismic signals, (2) second electrical control means operatively associated with said cathode ray tube and responsive to the D.-C. electrical signals for producing an indication of the magnitude of the electrical signal between each pair of successive intensity modulated transverse sweeps of said beam so as to form a longitudinal record of variations in the magnitude of said electrical signal on the same recording medium as said variable density log, (3) electrical depth marking means operatively associated with said cathode ray tube for periodically deactivating said first electrical control means during selected sweeps of the tube beam so as to form straight transverse traces across the recording medium at regular longitudinal intervals thereby providing indications of the borehole depth on the resulting record, (4) electrical time marking means operatively associated with said cathode ray tube for forming time marks at equal transverse intervals along each transverse trace of the tube beam with the time marks on successive traces being aligned with each other so as to form longitudinally extending time lines on the resulting record.

6. In apparatus for producing borehole logs from seismic signals and D.-C. electrical logging signals, the combination comprising recording means operatively associated with the downhole equipment for recording the seismic and electrical signals on a recording medium, said recording means including a cathode ray tube for developing an electron beam and means for sweeping said beam transversely back and forth across said recording medium in synchronism with successive seismic signals developed by the downhole equipment, (1) first electrical control means operatively associated with said cathode ray tube and responsive to said seismic signals for intensity modulating successive sweeps of the beam of said cathode ray tube in accordance with variations in the amplitude of successive seismic signals so as to form a longitudinal series of transverse traces varying in density according to variations in the amplitude of the seismic signal, means for moving said recording medium longitudinally relative to said cathode ray tube so that the longitudinal position of each transverse trace corresponds to the borehole depth at which each seismic signal is generated, (2) second electrical control means operatively associated with said cathode ray tube and responsive to the D.-C. electrical signals for deflecting said beam transversely according to the magnitude of said D.-C. signal between each pair of successive intensity modulated sweeps, said second electrical control means including means for instantaneously increasing the intensity of said beam at the point of maximum transverse deflection between each pair of successive intensity modulated sweeps so as to form a longitudinal record of variations in the magnitude of the D.-C. electrical signal as a function of borehole depth on the same recording medium as said variable density traces.

7. A method of producing borehole logs comprising the steps of transmitting periodic seismic signals at varying depths within a borehole, detecting both the initially arriving seismic signals and subsequently arriving wave energy at a point spaced away from the point of transmission and developing an electrical output varying in amplitude as a function of the amplitude of the detected seismic signals and wave energy, recording said electrical output on a recording medium as a series of successive traces corresponding to successive seismic signals and extending transversely across the recording medium as a function of time, varying the density of each transverse trace in accordance with variations in the amplitude of said electrical output, varying the longitudinal position of the successive variable density traces on the recording medium according to the depths at which the respective successive seismic signals are generated in the borehole, interrupting the density variations and varying the amplitude of selected transverse traces at regular longitudinal intervals in accordance with variations in the amplitude of said electrical output, forming straight transverse traces across the recording medium at equal longitudinal intervals to provide indications of the borehole depth on the recording medium, and forming time marks at equal transverse intervals along each trace with the time marks on successive traces being aligned with each other to form longitudinally extending time lines on the recording medium.

8. In apparatus for producing borehole logs from seismic signals and D.-C. electrical logging signals, improved log recording means operatively associated with the downhole equipment and comprising the combination of a cathode ray tube for developing an electron beam and means for sweeping said beam transversely back and forth across a recording medium in synchronism with the seismic signals, first electrical control means operatively associated with said cathode ray tube and responsive to the seismic signals for intensity modulating successive sweeps of the beam of said cathode ray tube according to variations in the amplitude of successive seismic signals so as to form a variable density log of said seismic signals, second electrical control means operatively associated with said cathode ray tube and responsive to the D.-C. electrical signal for producing a log of said electrical signals on the same recording medium as said variable density log of said seismic signals, said second electrical control means including an electrical signal gate and means for opening said gate between successive modulated sweeps of the tube beam for deflecting the beam transversely beyond the region covered by the modulated beam sweep with the points of maximum beam deflection varying in accordance with the magnitude of the electrical signal, and time delay means operatively associated with said electrical signal gate for delaying the opening of said gate for a predetermined interval following the completion of a modulated sweep of the beam to provide time for the modulating signal to subside.

9. Apparatus as defined in claim 8 in which said second electrical control means includes a counter for counting the seismic signals and producting an output pulse in response to the counting of a preselected number of said seismic signals, and an amplitude modulation gate responsive to the counter output for modulating the amplitude of the beam of said tube according to variations in the amplitude of the seismic signals so as to form periodic variable amplitude traces integrated with the variable density traces formed by the intensity modulation, said intensity modulation gate also being responsive to the counter output for interrupting the intensity modulation of the beam during the periodic amplitude modulated traces, and which also includes third electrical control means operatively associated with said cathode ray tube and responsive to the D-C electrical signals for producing a log of said electrical signals on the same recording medium as said variable density and variable amplitude log of said seismic signals, said third electrical control means including an electrical signal gate and means for opening said gate between successive modulated sweeps of the tube beam for deflecting the beam transversely beyond the region covered by the modulated beam sweeps with the points of maximum beam deflection varying in accordance with the magnitude of the electrical signal.

10. In apparatus for producing borehole logs from seismic signals and D-C electrical logging signals, improved recording means operatively associated with the downhole equipment and comprising the combination of a cathode ray tube for developing an electron beam and means for sweeping said beam transversely back and forth across a recording medium in synchronism with the seismic signals, first electrical control means operatively associated with said cathode ray tube for modulating the intensity of the beam of said tube according to variations in the amplitude of the seismic signals, second electrical control means operatively associated with said cathode ray tube for periodically deactivating said first electrical control during selected sweeps of the beam and modulating the vertical position of the beam according to variations in the amplitude of the seismic signals so as to produce periodic amplitude modulated traces integrated with the intensity modulated traces, and third electrical control means operatively associated with said cathode ray tube and responsive to the D-C electrical signals for producing an indication of the magnitude of the electrical signal between each pair of successive modulated traces of the beam so as to form a longitudinal record of variations in the magnitude of said electrical signal on the same recording medium as said intensity modulated and amplitude modulated traces.

11. A method of producing a borehole log comprising the steps of developing a first electrical signal derived from seismic logging signals, developing a second electrical signal derived from electrical logging signals, recording said first electrical signal as a series of variable density traces with successive traces corresponding to successive seismic signals and with the density variations in each trace corresponding to variations in the amplitude of the respective seismic signals, periodically recording said first electrical signal as a variable amplitude trace with the amplitude variation in said trace corresponding to variations in the amplitude of the respective signal as a trace extending longitudinally alongside said variable density and variable amplitude traces with the longitudinally extending trace varying transversely according to variations in the amplitude of said electrical logging signals.

12. A method of producing a borehole log comprising the steps of transmitting periodic seismic signals at varying depths within a borehole, detecting the resultant seismic waves at a point spaced away from the point of transmission and developing an electrical output varying in amplitude as a function of the amplitude of the detected seismic waves, recording said electrical output on a recording medium as a series of successive traces corresponding to successive seismic signals and extending transversely across the recording medium as a function of time, varying the longitudinal positions of the successive traces on the recording medium according to the depth at which the respective successive seismic signals are generated in the borehole with all of said traces having longitudinally aligned starting points, varying the density of successive transverse traces according to variations in the amplitude of said electrical output, and periodically interrupting said density variation at regular longitudinal intervals and varying the amplitude of selected transverse traces according to variations in the amplitude of said electrical output.

13. A method of producing a borehole log comprising the steps of transmitting periodic seismic signals at varying depths within the borehole, detecting the resultant seismic waves at a point spaced away from the point of transmission and developing an electrical output varying in amplitude as a function of the amplitude of the detected seismic waves, repetitively sweeping the beam of a cathode ray tube transversely across the face of the tube in synchronism with the transmission of said seismic signals, modulating the intensity of said beam during successive sweeps thereof by said variable amplitude electrical output so as to produce a series of variable density traces corresponding to the detected seismic waves, and periodically interrupting the intensity modulation of said beam and modulating the vertical position of said beam by said variable amplitude electrical output so as to produce periodic variable amplitude traces on the face of the tube, and recording said variable density traces and said variable amplitude traces on a recording medium while moving said recording medium past the face of said cathode ray tube at a rate sychronized with the rate of change in the borehole depth where said seismic signals are transmitted.

14. In apparatus for producing borehole logs from seismic signals, the combination comprising recording means operatively associated with the downhole equipment and including a cathode ray tube for developing an electron beam and means for sweeping said beam transversely back and forth across a recording medium in synchronism with the seismic signals, first electrical control means operatively associated with said cathode ray tube and responsive to the seismic signals for intensity modulating successive sweeps of the beam of said cathode ray tube according to variations in the amplitude of successive seismic signals so as to form a variable density log of said seismic signals, second electrical control means operatively associated with said cathode ray tube and responsive to the seismic signals for periodically deactivating said first electrical control means during selected sweeps of the beam and modulating the vertical position of the beam according to the amplitude of the corresponding seismic signal so as to form a variable amplitude log of selected seismic signals, and electrical time marking means operatively associated with said cathode ray tube for generating a series of timing pips to form time marks at equal transverse intervals along each transverse trace of the tube beam with the time marks on successive traces being aligned with each other so as to form longitudinally extending time lines on the resulting record, said time marking means including means for initiating said timing pips at the start of each transverse sweep of the electron beam and terminating the timing pips at the end of each transverse sweep.

15. Apparatus as defined in claim 14 in which said electrical time marking means includes a pulse generator for generating a series of timing pips to form time marks at equal transverse intervals along each transverse trace of the tube beam, and means associated with said pulse generator and operatively connected to said recording means for actuating said pulse generator at the start of each sweep of the beam to generate a series of timing pips to form time marks at equal transverse intervals along each transverse trace of the beam, and for deactivating the pulse generator at the end of each sweep.

16. Apparatus for producing borehole logs comprising the combination of a downhole tool including transmitting means for generating seismic signals at varying depths within the borehole and receiving means spaced away from said transmitting means for detecting the resultant seismic waves and developing an output varying in amplitude as a function of the amplitude of the detected seismic waves, recording means including a cathode ray tube for developing an electron beam and including means for sweeping said beam transversely back and forth in synchronism with the generated seismic signals, first electrical control means operatively associated with said receiving means and said cathode ray tube for modulating the intensity of the beam of said tube by the output from said receiving means so that the resulting transverse traces formed by the beam vary in density according to variations in the amplitude of the detected seismic waves, second electrical control means including means mechanically coupled to the downhole tool for producing a signature sweep output pulse each time said tool progresses a predetermined distance, an amplitude modulation gate responsive to the signature sweep output pulse for modulating the amplitude of the beam of said tube by the output from said receiving means so that periodic transverse traces formed by the beam vary in amplitude according to variations in the amplitude of the detected seismic waves, said first electrical control means also being responsive to the signature sweep output pulse for interrupting the intensity modulation of the beam during the periodic amplitude modulated traces.

17. Apparatus as defined in claim 16 which includes electrical depth marking means mechanically coupled to the downhole tool for producing a straight transverse trace across the recording medium each time said tool progresses a predetermined distance, thereby providing indications of the borehole depth on the recording medium.

18. A method of producing borehole logs comprising the steps of transmitting periodic seismic signals at varying depths within a borehole, detecting both the initially arriving seismic signals and subsequently arriving wave energy at a point spaced away from the point of transmission and developing a first electrical output varying in amplitude as a function of the amplitude of the detected seismic signals and wave energy, recording said electrical output on a recording medium as a series of successive traces varying in accordance with variations in the amplitude of said electrical output and extending transversely across the recording medium as a function of time, varying the longitudinal position of the successive transverse traces on the recording medium according to the depths at which the respective successive seismic signals are generated in the borehole, developing a second electrical signal derived from electrical logging signals, and recording said second electrical signal as a trace extending longitudinally along side said successive transverse traces with the longitudinally extending trace varying transversely according to variations in the amplitude of said electrical logging signals.

References Cited

UNITED STATES PATENTS

| | | | |
|---|---|---|---|
| 3,129,999 | 4/1964 | Brown et al. | 346—109 |
| 3,158,433 | 11/1964 | Alexander et al. | 346—110 |
| 3,170,136 | 2/1965 | Howes | 340—18 |
| 3,173,743 | 3/1965 | Weissensteiner | 346—110 X |
| 3,235,876 | 2/1966 | Brown | 346—109 |
| 3,333,237 | 7/1967 | Chapman | 340—18 X |
| 3,349,407 | 10/1967 | Hefer et al. | 346—116 |

RODNEY D. BENNETT, *Primary Examiner.*

D. C. KAUFMAN, *Assistant Examiner.*